T. Hill.
Pitman Coupling Box.

Nº 50,477. Patented Oct. 17, 1865.

Witnesses: Inventor: T. Hill

UNITED STATES PATENT OFFICE.

THOMAS HILL, OF ST. LOUIS, MISSOURI.

IMPROVEMENT IN JOURNAL-BOXES.

Specification forming part of Letters Patent No. 50,477, dated October 17, 1865.

*To all whom it may concern:*

Be it known that I, THOMAS HILL, of St. Louis, in the county of St. Louis and State of Missouri, have invented a new and Improved Journal-Box for Connecting-Rods, &c.; and I do hereby declare that the following is a full, clear, and exact description thereof, which will enable others skilled in the art to make and use the same, reference being had to the accompanying drawings, forming a part of this specification, in which—

Figure 1:
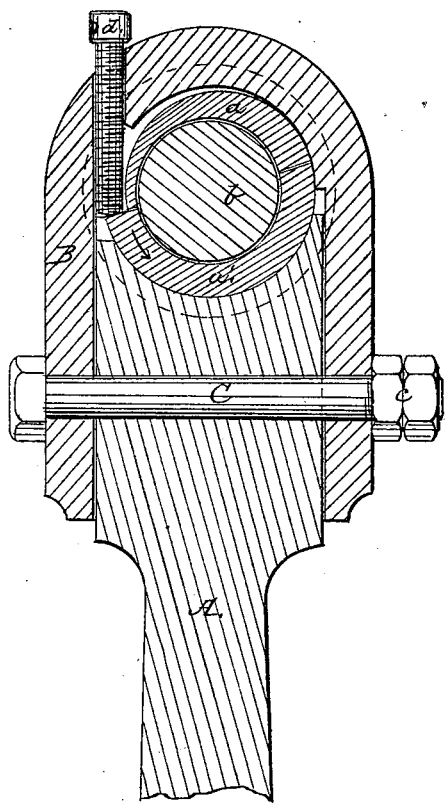
Figure 2:
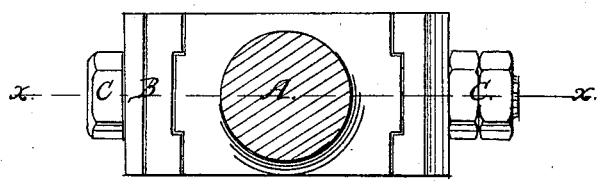

Figure 1 represents a longitudinal vertical section, the line $x$ $x$, Fig. 2, indicating the plane of section. Fig. 2 is an end view of the same.

Similar letters of reference indicate like parts.

The journal-boxes in the ends of connecting-rods are usually held in place by a strap fitted over the same and drawn up tight by a gip and key; and to keep this key in place and adjust it at pleasure it must be provided with a nut and screw or with any other suitable contrivance, which creates much labor and renders the construction of such connecting-rods expensive.

This invention consists in the use of a wedge-shaped box or cap in combination with one or two screws passing through the strap and bearing on the box in such a manner that by turning the screw the wedge-shaped box is turned and drawn up tight against the journal; or, when two screws are used, by turning one screw the box is tightened, and by turning the other it is held in position and prevented from coming back spontaneously, and the labor of constructing the box is materially reduced.

The drawings represent a box with a single screw, but from the following explanation the construction of a box with two screws will also be readily understood.

A represents a connection-rod of any desirable form and shape, the end of which is provided with boxes $a$ $a'$, intended to fit on and form the bearing for the crank-pin or any other journal, $b$. The boxes $a$ $a'$ are held in place by a strap, B, which stops over the end of the connecting-rod, and is held in place by a bolt, C', secured by jam-nuts $c$ or in any other suitable manner.

The strap, it will be noticed, is secured in a permanent manner, and no provision is made to tighten the same or to release it, in order to adjust the position of the boxes and to keep the same tight. This object is effected by making the box $a$ tapering toward one end, or, in other words, by cutting away a portion of said box, so that it will fit loosely in its socket, which is made circular in the usual manner. In order to tighten the box a screw, $d$, is applied, which is tapped into the end of the strap and extends down through a cavity in the rod bearing on the end of the box $a'$, as clearly shown in Fig. 1. This end projects beyond the edge of the box $a$, because the box $a'$ preserves its full thickness, whereas a portion of the box $a$ is cut away, as previously stated. By turning the screw back from the position in which it is shown in Fig. 1 the thin tapering portion of the box $a$ comes more and more opposite the cylindrical portion of the socket formed by the cap, and the journal is released by turning the screw down to the position shown in the drawings. The boxes $a$ $a'$ are turned round in the direction of the arrow marked on it, causing the same to wedge themselves more and more into the socket and to close up tighter and tighter against the journal.

For locomotives and other engines which turn both ways, it is desirable to add another screw opposite the screw $d$, and bearing on the box $a$ in such a manner that by its action the box is securely held in place when once adjusted, and that it is prevented from coming back spontaneously. Furthermore, by the use of my box, the length of the rod remains uniform, and all evil consequences of a change in their length are avoided.

Having thus described my invention, I claim as new and desire to secure by Letters Patent—

The wedge-shaped box $a$, with one or more screws, $d$, in combination with the connecting-rod A and strap B, constructed and operating substantially as and for the purpose set forth.

THOMAS HILL.

Witnesses:
JAMES COLLINS,
SAMUEL HAMBLETON.